Figure 1:
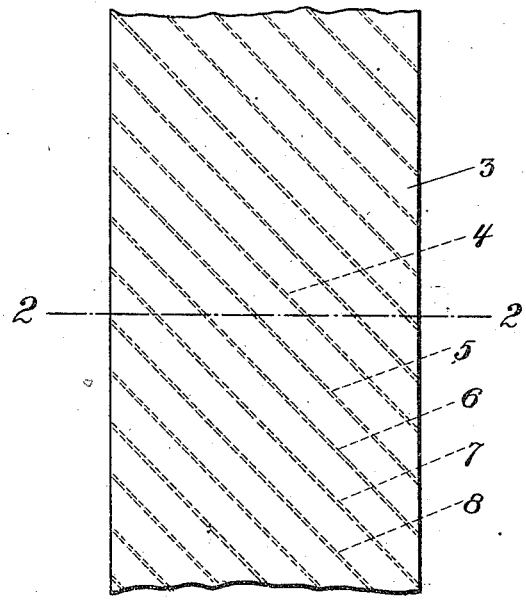

A. DOW.
RUBBER TIRE FOR VEHICLES.
APPLICATION FILED DEC. 6, 1911.

1,024,189.

Patented Apr. 23, 1912.

Witnesses:
H. Egan
Geo. N. Kerr

Alexander Dow  Inventor
By his Attorneys
Edwards, Sager & Wooster.

UNITED STATES PATENT OFFICE.

ALEXANDER DOW, OF NEW YORK, N. Y.

RUBBER TIRE FOR VEHICLES.

1,024,189.  Specification of Letters Patent. Patented Apr. 23, 1912.

Application filed December 6, 1911. Serial No. 664,152.

*To all whom it may concern:*

Be it known that I, ALEXANDER DOW, a citizen of the United States, residing at New York, in the county of New York and State of New York, have invented certain new and useful Improvements in Rubber Tires for Vehicles, of which the following is a full, clear, and exact specification.

My invention relates to improvements in rubber tires adapted for use on commercial and other vehicles, and more especially to improvements in the method of their internal construction to the end that more serviceable wearing qualities of the tire are secured and the tendency of such tires to open up from cuts or to break off in pieces of considerable size is overcome.

Tires are made in a variety of forms and the methods of attaching them to the wheel rim are diversified. My improvement deals solely with the construction of the solid rubber tire, and has nothing to do with the method of attachment of the same to the wheel rim.

A study of the conditions of distortion to which a tire is exposed in use discloses the fact that this distortion of the rubber occurs in three dimensions, or directions, vertically, laterally and circumferentially, each to an extent dependent upon the form and nature of the object producing it. And when a depression in the tire is made which exceeds the elastic limit of the material, tearing or cutting of the rubber follows and this opening once made readily enlarges, until parts of the tire fall away in consequence. It also follows from the peculiar changes which rubber undergoes during such service, that the whole body of the tire tends from repeated heating and cooling to contract in size, with the result that cuts which at first appear to close, later open and continue to tear and increase in size to the great deterioration of the tire.

I am aware that fabric has been inserted in the rubber of the body of the tire to prevent this continued tearing and to re-inforce the rubber, but this has not been done with the object in view to provide adequately for, and in a manner to permit of the sufficient distortion of the fabric in the three planes necessary and described above, and therefore the resiliency of the tire has been interfered with by the resistance of the fabric and stresses have been put upon the fabric to a degree which it was incapable of resisting and rupture has resulted. Cotton fabric such as is ordinarily used in tire manufacture is capable of longitudinal or lateral compression, but cannot be extended beyond a small degree without breaking or tearing except when pulled along the diagonal of the weave when considerable stretching is possible.

My invention consists in embodying during the construction of the tire, one or more layers of fabric corrugated, curved or otherwise disposed in such a manner, as to permit of any necessary distortion of the inclosing rubber in three directions or dimensions, without this fabric being compelled to stretch, and therefore without the resiliency of the tire being impaired, the particles of rubber being as free as heretofore to adjust themselves, as though the fabric was not inclosed, to displacement in any direction and being bound together and reinforced against tearing apart by the added strength of the fabric incorporated in the body of the rubber. Another advantage arising from the corrugated or curved layers of the fabric is that as the rubber of the tire wears away, continuous layers of the fabric are not brought to the surface, the same being exposed and wearing away only in lines or points, and therefore the layers of the rubber on the fabric do not strip in large sections as occurs frequently in pneumatic tires in which the fabric must be laid in concentric circles to resist the pressure of the air contained.

Figure 2:
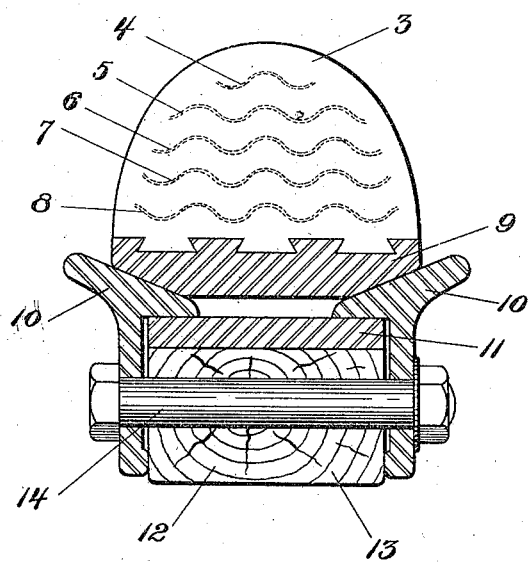

Referring to the drawings, in which the same reference characters indicate the same parts throughout the specifications: Figure 1 is a plan view of a portion of the tread of a solid tire embodying my invention. Fig. 2 is a vertical section of the same on the line 2—2.

The solid rubber tire 3 is of any of the usual or desired cross section, and for the sake of illustration I have shown the same as mounted on a base ring 9 secured on the felly 13 of a wheel by the clips 10 which extend in between the base ring 9 and a felly hand 11, the clips being held in position by the bolts 14. None of this construction however forms any part of my invention.

By my invention I insert in the body of the solid rubber tire 3 a separated series of circumferentially extending layers of fabric 4, 5, 6, 7 and 8, each of these layers being formed into undulations, the crests of which extend diagonally of the circumference of the tire. The strip of fabric forming the layers is cut on the bias so that the weave of the fabric extends diagonally of the circumference of the tire.

From the foregoing description it will be seen that I have provided a reinforce for a solid tire which, because of the fact that the weave of the fabric reinforce runs diagonally to the circumference of the tire, permits a yield circumferentially and at right angles thereto, and because of the diagonally extending undulations or corrugations the reinforce can also yield in lines diagonal to the circumference. The reinforce therefore, while preventing the disintegration of the tire, does not affect the resiliency thereof.

I realize that considerable variation is possible in the details of construction and arrangement of parts without departing from the spirit of my invention, and I therefore do not intend to limit myself to the specific form shown and described.

Having thus described my invention, what I claim as new and desire to secure by Letters Patent is,—

A solid tire formed of rubber and having embedded therein separate layers of circumferentially extending fabric, said layers extending through the major portion of the cross section of the tire, each layer being formed into undulations whose crests extend diagonally of the tire, and each layer being formed from strips of fabric whose weave extends diagonally of the layer.

In testimony whereof I affix my signature, in presence of two witnesses.

ALEXANDER DOW.

Witnesses:
H. C. EGAN,
GEO. N. KERR.